United States Patent [19]

Wascat

[11] 4,378,086
[45] Mar. 29, 1983

[54] DEVICE FOR POSITIONING AND WELDING BINDING HOOPS AROUND A CYLINDER

[75] Inventor: Raymond Wascat, Cuffies by Soissons, France

[73] Assignee: B.S.L. (Bignier Schmid-Laurent), France

[21] Appl. No.: 226,608

[22] Filed: Jan. 21, 1981

[30] Foreign Application Priority Data

Feb. 1, 1980 [FR] France ................ 80 02232

[51] Int. Cl.³ ............................................ B23K 31/00
[52] U.S. Cl. ...................................... 228/4.1; 228/48; 228/49 R
[58] Field of Search ...................... 228/4.1, 15.1, 6 R, 228/47, 48, 49 B

[56] References Cited

U.S. PATENT DOCUMENTS 4,295,592 10/1981 Schafer .................. 228/48

Primary Examiner—Nicholas P. Godici
Assistant Examiner—M. Jordan
Attorney, Agent, or Firm—Thomas J. Greer, Jr.

[57] ABSTRACT

The present invention relates to a device for positioning and welding binding hoops around a cylindrical element, or cylinder, of revolution, around determined circumferences of the cylinder. The device comprises a cylinder support, a drive member adapted to drive the cylinder in rotation about its axis of revolution, an applying member adapted to apply a half-hoop radially on the cylinder, a magazine or half-hoops adapted to supply the applying member, and a fixed welding station.

5 Claims, 7 Drawing Figures

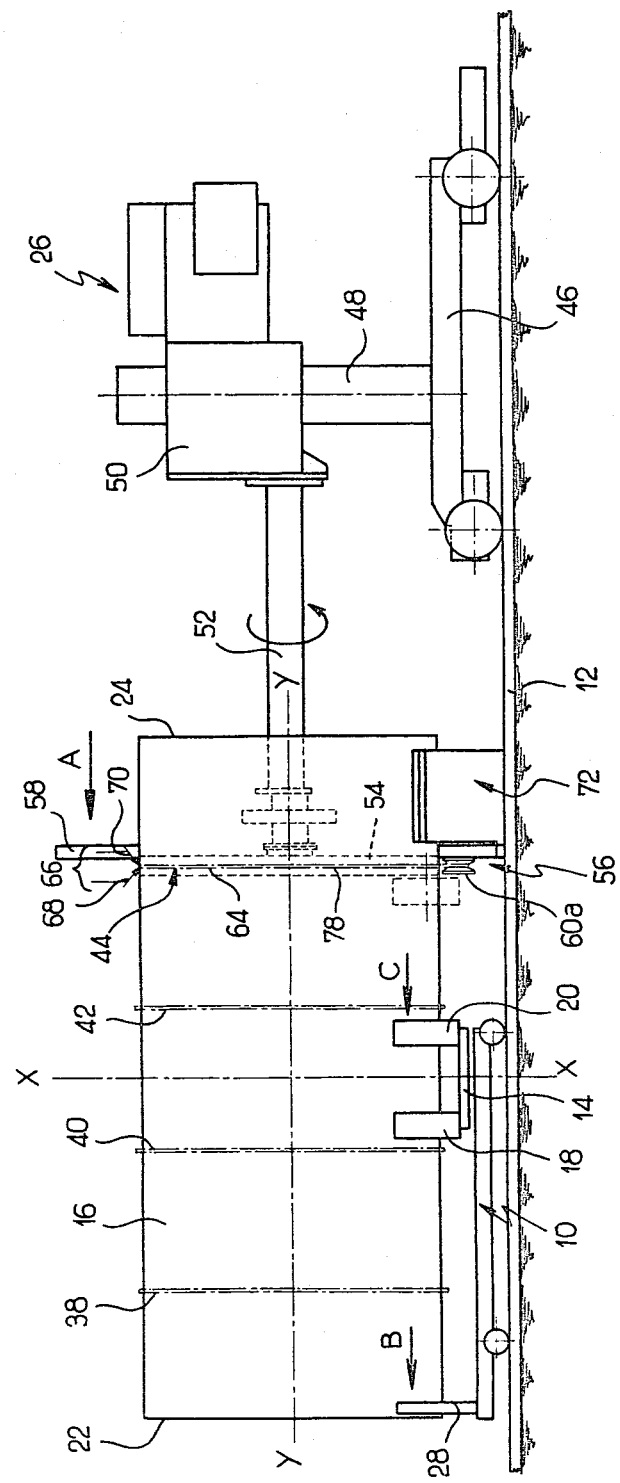
FIG_1

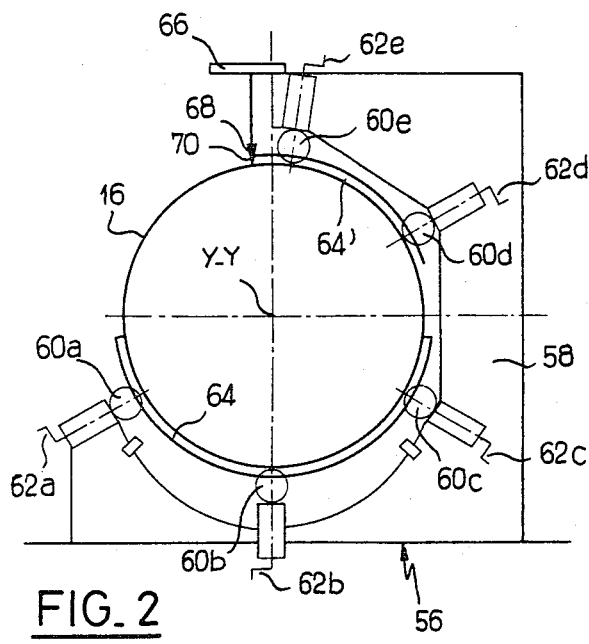
FIG_2
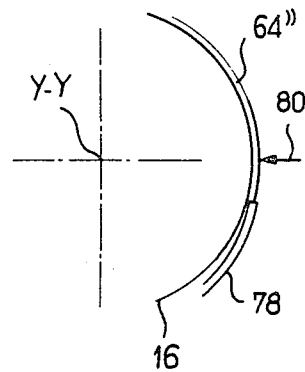
FIG_3
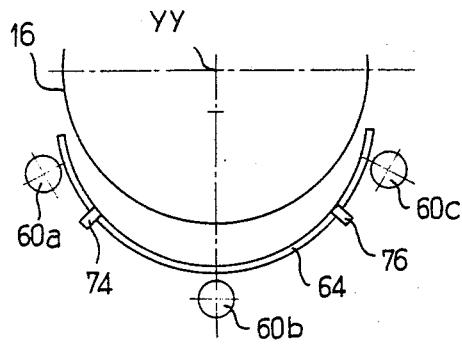
FIG_4
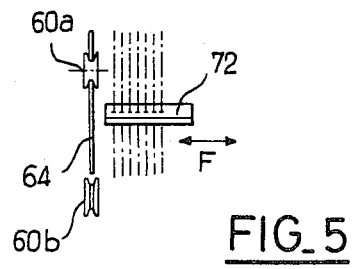
FIG_5
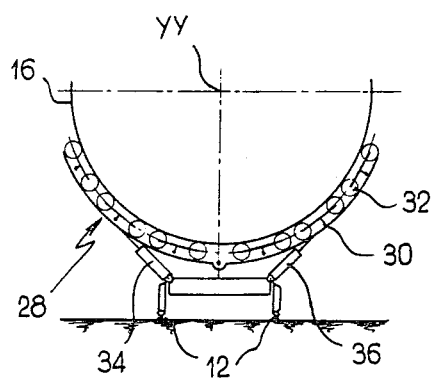
FIG_6
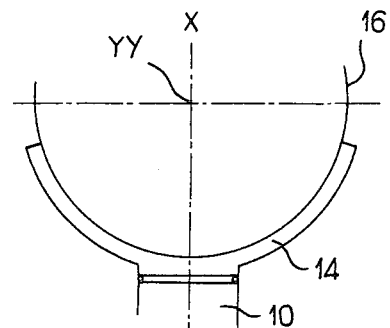
FIG_7

DEVICE FOR POSITIONING AND WELDING BINDING HOOPS AROUND A CYLINDER

The present invention relates to a device for positioning and welding binding hoops around a cylindrical element, or cylinder, of revolution, around determined circumferences of the cylinder.

Cylindrical elements used as containers or tanks are known to be generally strengthened on the outside by metal reinforcing rings or belts, called binding hoops, suitably placed around these cylinders.

A small number, for example four, of these binding hoops is used and each may be constituted by a single circular piece or by two semi-circular pieces disposed contiguously around the cylinder.

The binding hoops are at present positioned and welded essentially by hand, thus involving long and meticulous operations.

It is an object of the present invention to avoid such drawbacks by proposing a device for carrying out these operations quasi-automatically by one operator from a central control.

The invention relates more particularly to a device for positioning and welding circular binding hoops around a cylindrical element, or cylinder, of revolution, around determined circumferences of the cylinder. This device makes it possible to carry out the operations consisting in radially applying a first semi-circular half-hoop around a determined circumference of the cylinder, in rotating the cylinder about its axis of revolution to pass the first half-hoop in front of a fixed welding station and weld it continuously on the cylinder, in radially applying a second semi-circular half-hoop on the cylinder around said determined circumference and in abutment with the first half-hoop and in passing it in front of the welding station to weld it continuously on the cylinder after the first half-hoop has been welded, and in renewing these operations for each of the other hoops.

The device according to the invention advantageously carries out the operation consisting in rotating the cylinder about a horizontal axis by means of an expansion ring placed inside the cylinder around said determined circumference and rotated.

The device of the invention comprises a cylinder support, a drive member adapted to drive the cylinder in rotation about its axis of revolution, an applying member adapted radially to apply a half-binding hoop on the cylinder, a magazine of half-hoops adapted to supply the applying member, and a fixed welding station.

According to another feature of the device of the invention, the cylinder support comprises a mobile carriage movable horizontally on a track, this carriage being provided with a central cradle adapted to support the cylinder with its axis of revolution disposed horizontally and parallel to the track and with an end cradle allowing the free rotation of the cylinder and movable between a low position where the cylinder rests on the central cradle and a high position where the cylinder may be rotated by the drive member, without contact with the central cradle.

According to a further feature of the device of the invention, the drive member comprises a carriage movable on the track, an expansion ring borne by the carriage and adapted to be introduced inside the cylinder, to be expanded to render the cylinder circular around the determined circumference where the hoop must be placed, and to be rotated about a horizontal axis, parallel to the track and adjustable in height.

The central cradle of the cylinder support is advantageously mounted to rotate on the carriage between two positions at 180° with respect to each other, in order to place one or the other of the ends of the cylinder opposite the drive member.

According to another feature of the device of the invention, the applying member comprises a plurality of pressure rollers distributed regularly around a circumference of which the axis determines the position of the axis of revolution of the cylinder, each pressure roller being adjustable radially in position as a function of the diameter of the cylinder and being radially movable in the direction of the cylinder or in opposite direction.

The magazine of the device of the invention supports the half-hoops in vertical planes parallel to one another and perpendicular to the track and is animated by a movement of translation parallel to the track to bring each half-loop successively between the cylinder and certain of the pressure rollers, after having spaced the latter radially away from the cylinder.

The invention will be more readily understood on reading the following description with reference to the accompanying drawings, in which:

FIG. 1 is an elevational view of a device according to the invention.

FIG. 2 is a view taken in the direction of arrow A of FIG. 1.

FIG. 3 is a partial view of FIG. 2 showing the positioning of a second half-hoop contiguously with a first half-loop.

FIG. 4 is a partial view corresponding to FIG. 2 and showing the position of a half-hoop before application on the cylinder.

FIG. 5 is a side view of FIG. 4 showing the magazine.

FIG. 6 is a view taken in the direction of arrow B of FIG. 1; and

FIG. 7 is a view taken in the direction of arrow C of FIG. 1.

Referring now to the drawings, FIG. 1 shows a motorized carriage 10, capable of indexed displacement on a horizontal track 12 constituted by two parallel rails. The carriage 10 is provided with a central cradle 14 mounted to rotate about a vertical axis XX of the carriage and adapted to receive a cylindrical element, or cylinder, 16 having a symmetry of revolution about its axis YY.

The cylinder 16 is placed with its axis YY disposed horizontally and parallel to the track 12 so that the central part of the cylinder rests on the central cradle 14. To this end, the central cradle 14 comprises two cradle elements 18 and 20 spaced from each other and having a contour in the form of an arc of circle, said cradle being adapted to receive the cylinder 16 (cf. FIG. 7). The elements 18 and 20 may be provided with suitable linings to be adapted to the circumference of the cylinder to be treated.

The central cradle 14 may be moved between two positions at 180° with respect to each other, so as to be able to place the open end 22 or the open end 24 of the cylinder 16 opposite a drive member 26 movable on the track 12 and which will be described in detail hereinafter. In the position shown in FIG. 1, the end 24 of the cylinder 16 is opposite this drive member, the axis of revolution YY of the cylinder 16 being parallel to the direction of the track 12.

The carriage 10 also supports an end cradle 28 which will be described more particularly with reference to FIG. 6.

The cradle 28 comprises a frame 30 in the form of an arc of circle, supporting a plurality of rollers, such as 32, mounted idly about an axis of rotation parallel to the axis YY of the cylinder, so as to allow the cylinder 16 to rotate freely on the rollers 32. The frame 30 is supported by the carriage 10 via two jacks 34 and 36 enabling the cradle 28 to be moved between a low position in which the cylinder rests horizontally on the central cradle 14 and a high position in which the cylinder no longer rests on the central cradle 14 and may be rotated by the drive member 26. When the cylindrical element 16 is rotated, it is in high position, the end 22 being raised by the end cradle 28 and the end 24 itself being raised by the drive member 26, as will be explained hereinafter.

The cylinder 16 is adapted to receive four circular binding hoops, each formed by two semi-circular half-hoops, around suitably spaced, respective circumferences of said cylinder. In the embodiment shown in FIG. 1, circular hoops 38, 40 and 42 have already been placed around the cylinder 16 and a hoop 44 is in the course of being positioned. The hoops used are hoops composed of two semi-circular parts placed contiguously on the outside and around the cylinder, around a corresponding determined circumference.

Hoops 38 and 40 were placed and welded on the cylinder 16 when the end 22 of the cylinder was facing the drive member 26, while hoop 42 was placed when the end 24 was in the position shown in FIG. 1. Similarly, the hoop 44 is in the course of being positioned in this same position.

The drive member 26 is an existing machine known per se, which comprises a motorized carriage 46, movable on the track 12 and supporting a vertical column 48 on which a drive assembly 50 slides vertically, bearing a horizontal rotating shaft 52 terminated by an expansion ring 54 introduced inside the cylinder 16 at the circumference where the corresponding hoop is to be positioned. In the embodiment of FIG. 1, the ring 54 is thus introduced inside the cylinder 16 through the open end 24 and is placed where the hoop 44 is to be positioned.

The drive member 26 thus makes it possible both to raise the end 24 of the cylinder by raising the drive assembly 50 with respect to the column 48 and to rotate the cylinder 16 via the expansion ring 54, at the adequate speed for welding. This expansion ring 54 exerts a radial thrust inside the cylinder 16 and ensures that the cylinder is perfectly circular at the circumference where the corresponding hoop is to be positioned.

The device of the invention further comprises an applying member 56, fixedly disposed with respect to the track 12, and adapted radially to apply a half-hoop on the cylinder 16. The applying member 56 will be described more particularly with reference to FIG. 2.

The applying member 56 comprises a support structure 58 disposed in a vertical plane perpendicular to the direction of the track 12, i.e. perpendicular to the axis YY of the cylinder 16. This structure 58 surrounds substantially three-quarters of the cylinder 16 in an arc. The applying member 56 comprises a plurality of pressure rollers 60 distributed regularly around a circumference of which the axis determines the position of the axis of revolution YY of the cylinder 16. In the present case, the applying member 56 comprises five pressure rollers 60a, 60b, 60c, 60d and 60e, disposed at 60° with respect to one another. The pressure rollers 60 are movable radially in the direction of the axis of revolution YY of the cylinder 16 and are adjustable in position by respective cranks 62a, 62b, 62c, 62d and 62e as a function of the diameter of the cylinder to be treated. The pressure rollers 60 are controlled by pneumatic jacks and may be actuated radially either in the direction of the cylinder 16, or in the opposite direction.

In the position shown in FIG. 2, the pressure rollers are actuated in the direction of the cylinder 16 and apply a semi-circular half-hoop 64 against the cylinder 16 at the moment when it is positioned beneath the cylinder 16 and during the rotation of the cylinder 16 about its axis of revolution, as will be explained hereinafter. Thus, the half-hoop 64 is firstly applied beneath the cylinder 16 by means of the three pressure rollers 60a, 60b and 60c located in the lower part and may then reach an upper position 64' by being applied by the pressure rollers 60c, 60d and 60e.

The structure 58 also serves as support for a welding station 66 comprising two welding torches 68 and 70 adapted to weld the two sides of a half-hoop on the cylinder 16. These two torches 68 and 70 are advantageously constituted by semi-automatically operating torches.

FIG. 4 shows the position of the pressure rollers 60a, 60b, and 60c when they are moved away from the cylinder 16, before the half-hoop 64 is positioned on the cylinder 16.

The applying member 56 is supplied by a magazine 72 shown more particularly in FIGS. 4 and 5. This magazine 72 comprises two supports 74 and 76 and is movable parallel to the track 12 in the direction indicated by arrow F of FIG. 5. The supports 74 and 76 may receive the appropriate number of half-hoops, for example eight half-hoops if four hoops are to be placed around a cylinder. The magazine 72 is moved horizontally until a half-hoop such as 64 is located above the pressure rollers 60a, 60b and 60c which are then in a position spaced apart from the cylinder. These pressure rollers are then moved radially in the direction of the cylinder 16 so that they can disengage the half-hoop 64 from the supports 74 and 76 and apply it radially in the direction of the cylinder.

The functioning of the device of the invention will now be described hereinafter.

In starting position, the carriage 10 and the carriage 46 supporting the drive member 26 are both in spaced apart relationship on either side of the fixed members, namely the magazine 72 and the applying member 56. A cylinder 16 is then deposited, by means of an appropriate device (not shown), on the central cradle 14 and on the end cradle 28 which is then in low position.

The carriage 10 is then moved towards the right in FIG. 1 so as to bring the cylinder 16 in a position such that the circumference intended to receive the hoop to be placed is in the same plane as the pressure rollers 60 of the applying member 56.

The carriage 46 is then moved towards the left in FIG. 1 so as to introduce the expansion ring 54 inside the cylinder 16 at the level of the circumference where the hoop is to be positioned. This ring is expanded and the cylinder 16 is raised by acting on the one hand on the end cradle 28 and on the other hand on the displacement of the drive assembly 50 of the drive member 26. The cylinder 16 is then in high position and disengaged from the central cradle 14.

A first half-hoop 64 is then brought by means of the magazine above the pressure rollers 60a, 60b and 60c and beneath the cylinder 16. All the pressure rollers are then actuated, so as to apply the half-hoop 64 beneath the cylinder 16 and the expansion ring 46 is driven in rotation so that the cylinder 16 rotates about its axis of revolution YY, taking the half-hoop 64 with it. As the cylinder rotates, the half-hoop 64 is applied against the cylinder successively by the pressure rollers 60d and 60e and reaches the position 64' shown in FIG. 2 in which the top end of the half-hoop arrives at the level of the welding station 66.

At this level, this end is spot welded on the cylinder 16 and welding with torches 68 and 70 is commenced, the cylinder 16 being continuously rotated. The half-hoop 64 is thus continuously welded on the cylinder 16.

While this welding is being carried out, the magazine 72 brings a second half-hoop 78 into position, the positioning thereof being synchronised with the positioning of the first half-hoop 64 so that it comes into abutment on the half-hoop 64, as shown in FIG. 3. Thus, the half-hoop 78 is pushed radially in the direction of the cylinder 16 so that its top end comes into abutment on the bottom end of the half-hoop 64 when it is in position 64″ (FIG. 3).

The second half-hoop 78 is applied radially against the cylinder 16 due to the pressure rollers 60. At this position, an optional synchronized operation may be provided for edge-welding the two ends of the half-hoops, with the aid of a welding torch (shown schematically at 80 in FIG. 3) so as to ensure a positive bond. The second half-hoop 78 is thus continuously welded after the first half-hoop 64 has been welded, until the cylinder 16 has made a complete rotation about its axis YY.

Once the two half-hoops have been welded, the pressure rollers 60 are moved away and the cylinder is returned into low position by acting on the end cradle 28 and on the adjustment in height of the drive assembly 50 and the expansion ring 54 is retracted. If there is no other hoop to be welded on the cylinder, the carriage 46 is moved to disengage the expansion ring 54 from inside the cylinder and the carriage 16 is moved to disengage the cylinder from the applying member 56. The cylinder may then be lifted out of the central cradle 14 which is ready to receive another cylinder. If another hoop is to be welded, the carriage 10 is displaced, if necessary making a rotation through 180° of the central cradle 14 so as to bring the cylinder in a position such that the circumference of the cylinder which is to receive the new hoop is in the vertical plane containing the pressure rollers 60 and operation is as indicated hereinabove.

The different members of the device of the invention may be controlled by one operator from a central control connected to these different members.

The invention is not limited to the embodiment specifically described and shown and other variants may be made without departing from the scope thereof.

What is claimed is:

1. A device for positioning and welding circular binding hoops around a cylindrical element, or cylinder, of revolution, around determined circumferences of the cylinder, said device comprising: a cylinder support, a drive member adapted to rotate the cylinder about its axis of revolution, an applying member adapted to apply a half-hoop radially on the cylinder, a magazine of half-hoops adapted to supply the applying member, a fixed welding station the cylinder support comprising a mobile carriage movable horizontally on a track, said carriage being provided with a central cradle adapted to support the cylinder with its axis of revolution disposed horizontally and parallel to the track and with an end cradle allowing the cylinder to rotate freely and movable between a low position where the cylinder rests on the central cradle and a high position where the cylinder may be rotated by the drive member, without contact with the central cradle.

2. A device for positioning and welding circular binding hoops around a cylindrical element, or cylinder, of revolution around determined circumferences of the cylinder, said device comprising: a cylinder support, a drive member adapted to rotate the cylinder about its axis of revolution, an applying member adapted to apply a half-hoop radially on the cylinder, a magazine of half-hoops adapted to supply the applying member, a fixed welding station, the applying member comprising a plurality of pressure rollers distributed regularly around a circumference of which the axis determines the position of the axis of revolution of the cylinder, each pressure roller being adjustable radially in position as a function of the circumference of the cylinder and being movable radially in the direction of the cylinder or in opposite direction.

3. A device for positioning and welding circular binding hoops around a cylindrical element, or cylinder, of revolution, around determined circumferences of the cylinder, said device comprising, a cylinder support, a drive member adapted to rotate the cylinder about its axis of revolution, an applying member adapted to apply a half-hoop radially on the cylinder, a magazine of half-hoops adapted to supply the applying member, a fixed welding station, the magazine supporting the half-hoops in vertical planes parallel to one another and perpendicular to the track and is actuated by a movement of translation parallel to the track to bring each half-hoop successively between the cylinder and certain of the pressure rollers, after the latter have been radially moved away from the cylinder.

4. The device of claim 1, wherein the drive member comprises a carriage movable on the track, an expansion ring borne by the carriage and adapted to be introduced inside the cylinder, to be expanded to ensure that the cylinder is circular around the determined circumference where the hoop is to be placed, and to be driven in rotation around a horizontal axis parallel to the track and adjustable in height.

5. The device of claims 1 or 4 wherein the central cradle of the cylinder support is mounted to rotate on the carriage between two positions at 180° with respect to each other to ensure that one or the other of the ends of the cylinder is opposite the drive member.

* * * * *